Jan. 23, 1940.   R. D. SMITH   2,188,121
MAKING ARTICLES OF FUSED SILICA
Filed Dec. 11, 1936
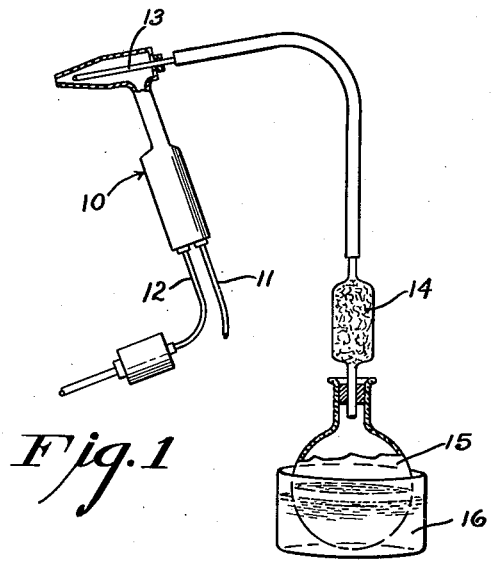
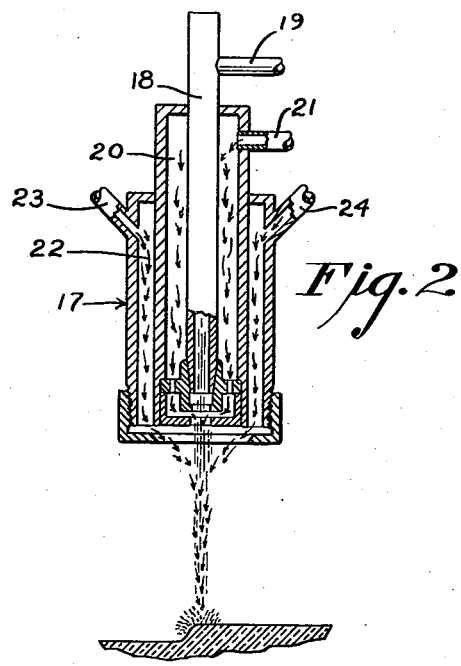
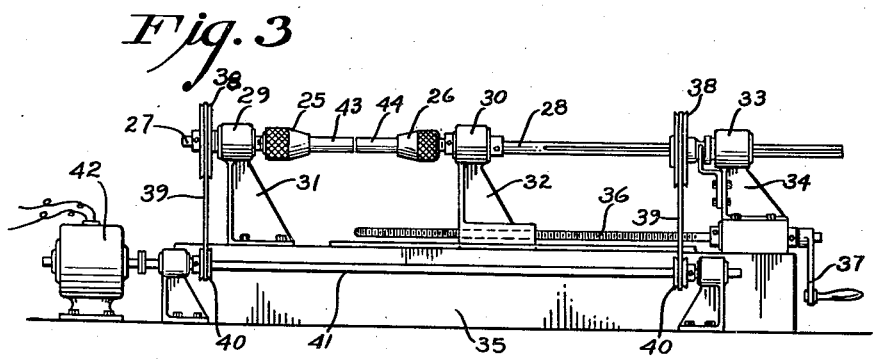
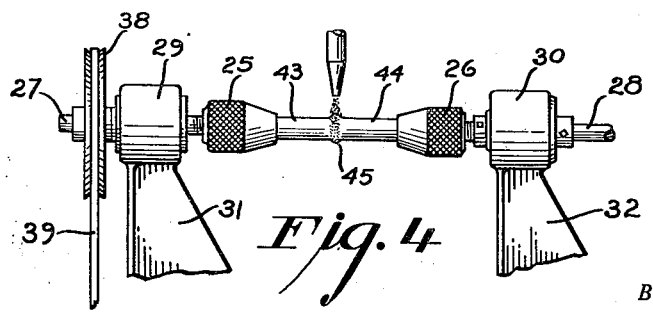
INVENTOR.
ROWLAND D. SMITH
BY Dorsey & Cole
ATTORNEYS.

Patented Jan. 23, 1940

2,188,121

UNITED STATES PATENT OFFICE 2,188,121

MAKING ARTICLES OF FUSED SILICA

Rowland D. Smith, Corning, N. Y., assignor to Corning Glass Works, Corning, N. Y., a corporation of New York Application December 11, 1936, Serial No. 115,435

9 Claims. (Cl. 47—78.1)

This invention relates to the production of fused silica and has for its object to produce transparent silica articles in the form of tubes, rods, and the like at less cost and of higher quality than has heretofore been possible.

Pure silica can be melted only at very high temperatures and never becomes fluid as do ordinary commercial glasses but remains pasty even at 2200° C. Therefore silica glass cannot be prepared and worked in the manner customary for ordinary glass, but must be forged from reheated billets of the material. Prior methods of working the reheated viscous mass of silica are discontinuous processes wherein an individual billet is required for each article.

The present invention includes among its features a continuous process for forming silica articles by continuously depositing finely divided molten silica on a refractory bait and continuously elongating the molten silica by means of another bait attached thereto and moving away from the first bait at a suitable speed. The finely divided molten silica may be produced by passing a dust of powdered silica by means of a gas stream through a high temperature burner or it may be produced by vaporizing a hydrolyzable compound of silicon such as silicon tetrachloride into the flame of the burner. In the first case the silica dust is melted in the hot zone of the flame and projected as discrete molten particles. In the second case the silicon compound is hydrolized by the water vapor in the combustion products of the flame thus forming finely divided hydrated silica which on passing through the hot zone of the flame is dehydrated and melted and is projected by the flame as discrete molten particles. The refractory baits are preferably composed of fused silica in the form of sections of tubing or rod, depending upon whether the article to be formed is hollow or solid.

The invention may be better understood by referring to the accompanying drawing in which:

Fig. 1 is a side view partly in section of a burner adapted to deposit finely divided molten silica from the vapor of a hydrolyzable compound of silicon.

Fig. 2 is a sectional view of a burner adapted to deposit finely divided molten silica from silica dust.

Fig. 3 is a side view of an apparatus for producing articles from continuously deposited finely divided molten silica, and Fig. 4 is an enlarged detail of Fig. 3 showing the apparatus in operation.

In Fig. 1 a high temperature burner, generally designated 10, which may be of the conventional type known as an oxyhydrogen torch, is provided with tubes 11 and 12 for supplying oxygen and a combustible gas thereto. A small tube 13 is inserted through the neck of the burner so that the tip of the tube is in the mouth of the burner and vapor issuing from the tube 13 will be projected into its flame. The projecting outer end of the tube 13 is connected by rubber tubing to a filter tower 14 which contains glass wool and which is joined by an air tight joint to a flask 15 containing a hydrolyzable compound of silicon, such as silicon tetrachloride, and heated by a water bath 16.

In Fig. 2 another type of burner generally designated 17 is provided with an inner conduit 18 to which oxygen is supplied by a tube 19 and an outer conduit 20 to which a combustible gas such as hydrogen is supplied by a tube 21, the hydrogen being deflected by the end wall of the conduit 20 at right angles into the oxygen jet from the conduit 18. Around the conduit 20 is a third conduit 22 to which hydrogen or other combustible gas is supplied by tubes 23 and 24. Finely divided silica is introduced into the gas stream in the conduit 22 by any suitable means (not shown).

In Fig. 3 a pair of opposed chucks 25 and 26 are mounted on shafts 27 and 28 which pass through bearings 29 and 30 and are supported by a head stock 31 and a tail stock 32. The shaft 27 is hollow and may, if desired, serve to admit compressed air as will later appear. The shaft 28 is longitudinally fixed in the bearing 30 and is slidably supported by a bearing 33 in an auxiliary tail stock 34. The head stock 31 and the auxiliary tail stock 34 are bolted to a lathe bed 35 while the tail stock 32 is slidably engaged with the lathe bed and is adapted to be moved longitudinally thereof with the shaft 28 by means of a screw 36 which passes through the bases of the tail stock 32 and the auxiliary tail stock 34, said screw having a crank 37 at its outer end for turning it. Keyed to the shafts 27 and 28 are pulleys 38, the shaft 28 being adapted to slide through its pulley. The pulleys 38 are driven by belts 39 and by pulleys 40 which are attached to a counter shaft 41. A driving motor 42 is connected to one end of the counter shaft 41. In the chucks 25 and 26 are placed cylindrical baits 43 and 44 respectively which are composed of silica or other refractory material to which fused silica will adhere, such as alumina, aluminum silicate, etc.

In practicing my invention the baits 43 and 44 are butted together and the flame of the burner which deposits molten finely divided silica, such as one of the burners 10 or 17, is allowed to impinge on the junction of the baits while they are being rotated at uniform speed. The molten silica thus deposited is built up in the form of a ridge 45, as shown in Fig. 4, and is maintained at a sufficiently high temperature to remain in a softened viscous condition by the heat of the burner which is held close enough for that purpose. While the molten silica is thus being deposited, the baits 43 and 44 are slowly separated by suitable rotation of the crank 37 at a speed sufficient to draw the plastic ridge of silica 45 continuously out into a uniform cylindrical shape, the ridge being continuously maintained by freshly deposited molten silica from the burner. In this manner a rod of pure transparent silica of desired dimensions, depending upon the diameter of the baits and the distance to which they are separated, may be obtained.

In a similar manner silica tubing may be formed continuously by providing the bait 43 with a hole extending longitudinally therethrough and communicating with the hollow shaft 27. Finely divided molten silica is deposited as heretofore shown over the junction of the baits to form the ridge of plastic silica 45 after which compressed air is admitted in controlled amount from a source not shown through the shaft 27 and the bait 43 and the two baits 43 and 44 are separated in the manner described above. The ridge 45 is thus drawn out in tubular form and sufficient air pressure is maintained therein to prevent collapse of the tube. By means of the described apparatus, tubing of non-uniform cross-section, that is, having constrictions and enlargements in the walls thereof, may be produced. This may be done merely by suitably varying the air pressure within the tube and/or varying the speed with which the two baits 43 and 44 are moved apart. By varying only the speed of separation of the baits, the formed tube may be provided with a thickened wall at any desired point whereby in a subsequent operation the tube may be reheated and blown out to form a flask, bottle, or other article. Furthermore, by a suitable variation of the pressure within the tube, constrictions and enlargements in the walls thereof may be provided. Auxiliary depositing burners may also be employed to form regular or irregular projections on the tube such, for example, as a spiral rib for the accommodation of a coil winding on a tube adapted as the core of an electrical resistance unit or heating device.

It will be apparent that the apparatus may be operated in a vertical position instead of the horizontal position shown in Fig. 3 without departing from the scope of my invention as claimed. In such case, the rod or tube of silica will be drawn vertically either upward or downward as desired.

I claim:

1. The method of making articles of fused silica, which includes depositing finely divided molten silica from a high temperature flame upon the abutting ends of separable baits to form a mass of molten silica adhering thereto and at the same time continuously separating the baits to locally elongate the molten mass and form the article.

2. The method of making articles of fused silica, which includes depositing finely divided molten silica from a high temperature flame upon the abutting ends of rotatably mounted separable baits, rotating the baits to form an annular mass of molten silica adhering thereto and at the same time continuously separating the baits while they are being rotated to locally elongate the molten mass and form the article.

3. The method of making articles of fused silica, which includes continuously introducing finely divided silica into a flame of combustible gas combined with oxygen, impinging the flame upon the abutting ends of separable baits to form a mass of molten silica adhering thereto and at the same time continuously separating the baits to locally elongate the molten mass and form the article.

4. The method of making articles of fused silica, which includes vaporizing a hydrolyzable compound of silicon into a flame of combustible gas combined with oxygen, impinging the flame upon the abutting ends of separable baits to form a mass of molten silica adhering thereto and at the same time continuously separating the baits to locally elongate the molten mass and form the article.

5. The method of making articles of fused silica, which includes depositing finely divided molten silica from a high temperature flame upon the abutting ends of rotatably mounted separable baits, at least one of which has a longitudinal bore for the admission of air, rotating the baits to form an annular mass of molten silica adhering thereto, introducing air through the tubular bait and at the same time continuously separating the baits to locally elongate the molten mass and form a tube.

6. The method of making articles of fused silica, which includes depositing finely divided molten silica from a high temperature flame upon the abutting ends of rotatably mounted separable baits, at least one of which has a longitudinal bore for the admission of air, rotating the baits to form an annular mass of molten silica adhering thereto, introducing air through the tubular bait and at the same time separating the baits at a varying speed to locally elongate the molten mass and form a tube having a wall of variable thickness.

7. The method of making articles of fused silica, which includes depositing finely divided molten silica from a high temperature flame upon the abutting ends of rotatably mounted separable baits, at least one of which has a longitudinal bore for the admission of air, rotating the baits to form an annular mass of molten silica adhering thereto, introducing air through the tubular bait, at the same time continuously separating the baits to locally elongate the molten mass and varying the internal air pressure within the elongated mass to cause a variation in its diameter.

8. The method of making articles of fused silica which includes forming a molten annular mass of silica by gradually depositing molten silica between and upon rotating separable baits, continuously rotating the baits, maintaining the mass in molten condition and elongating said mass by a separation of said baits.

9. The method of making articles of fused silica which includes forming a molten annular mass of silica by gradually depositing molten silica between and upon two rotating and relatively separable baits, continuously rotating the baits, maintaining the mass in molten condition and concomitantly elongating the mass by restraining one bait against axial movement and continuously withdrawing the other bait therefrom.

ROWLAND D. SMITH.